Jan. 18, 1949.  S. L. BURGWIN  2,459,616
CONTROL APPARATUS FOR INDUCTION HEATING SYSTEMS
Filed July 28, 1944

WITNESSES:
Wm. B. Sellers

INVENTOR
Stephen L. Burgwin.
BY
B. L. Zangwill
ATTORNEY

Patented Jan. 18, 1949

2,459,616

UNITED STATES PATENT OFFICE 2,459,616

CONTROL APPARATUS FOR INDUCTION HEATING SYSTEMS

Stephen L. Burgwin, Forest Hills, Pa., assignor to Westinghouse Electric Corporation, East Pittsburgh, Pa., a corporation of Pennsylvania Application July 28, 1944, Serial No. 547,050

1 Claim. (Cl. 250—41.5)

In the process of flowing the tin coating on tin plate, such as disclosed in the patent-application of G. E. Stoltz and R. M. Baker, Serial No. 464,040, filed October 11, 1942, now abandoned, the tin-plated strip is continuously passed through an induction heating means in which the matte coating on the steel strip, which had previously been deposited thereon, flows and becomes shiny. Upon solidifying the coating retains its bright mirror-like finish and has been found to have much greater resistance to corrosion. In such a system a large amount of power is concentrated in a relatively short length of traveling strip, and proper heating is dependent upon maintaining a proper relation between the volume of the material passing the induction heating means and the power input thereto. It is important to provide a means which will quickly control or regulate the heating power being delivered to the strip.

In the aforesaid application, a light responsive means which varies in accordance with a condition of the surface of the tin plate is used to regulate the power delivered by a tube-oscillator generator to the strip, the surface-condition being an indication of the temperature or heat-treatment of the material. In a sense, my invention is directed to improvements in control apparatus for heating means of the foregoing and other types, comprising regulating or controlling means for adjusting the heating of traveling strip, or other material, in accordance with the heat requirements of the strip, or other material, as it moves through the heating means.

It is an object of my invention to provide a control apparatus for an induction heating system for flowing tin plate, which will tend to keep the flow-line, or the line of demarcation between the relatively flowed and unflowed tin coating, within a predetermined space or spot under different and changing speeds of travel of the tin plate, and especially when the production line must be slowed down and then speeded up as is required where reels or coils are spliced so that continuous production can be maintained.

It is an additional object of my invention to provide a control apparatus for an electrical heating system of a type described, which will begin to change its heating output in accordance with a variation in heating requirements, but before the full change has been indicated, and in manner for avoiding hunting or overshooting. To this end the deviation from a mean value and the rate at which it is departing from or approaching the mean value are utilized in the operation of my invention.

It is a more general object of my invention to provide a control or regulating system which will quickly respond to the value of a changing quantity and also to its rate of change, so as to substantially eliminate tendencies to overshoot or hunt.

In a sense, this invention is an improvement related to the aforesaid application Serial No. 464,040 and the applications referred to therein.

Further objects, features, innovations and advantages of my invention will be discernible from the following description of a preferred form thereof, which is to be taken in connection with the accompanying drawing. The drawing is generally schematic and not to scale. In the drawing.

Figures 1, 2, 3:
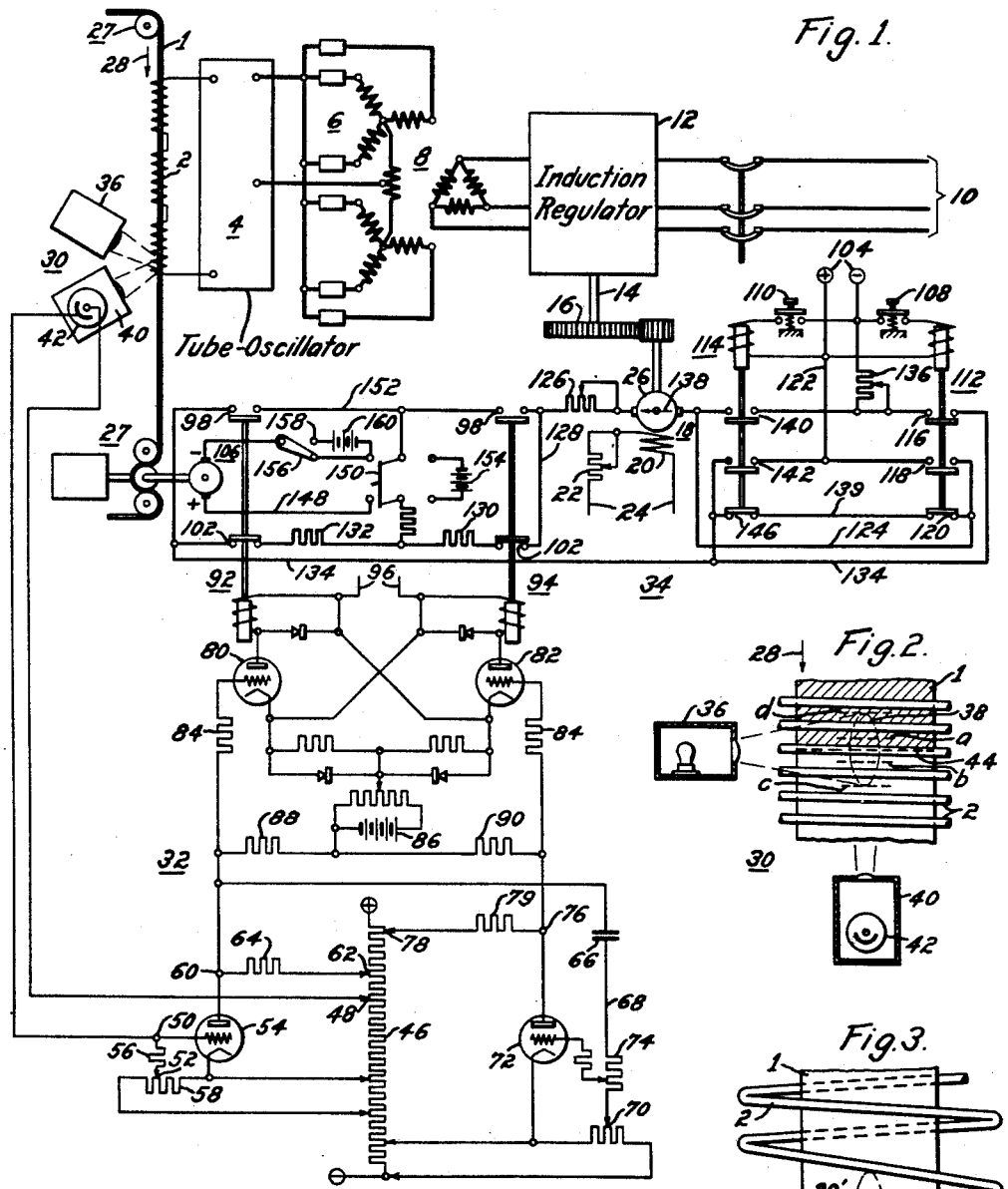
Figure 1 is a schematic view and wiring diagram of a part of an induction heating system for flowing tin plate, with emphasis placed on the control system for controlling the power supplied to the induction heating coil means.
Fig. 2 is a schematic fragmentary view, looking broadside at the strip, of the light responsive or scanning means which initiates controlling operations.
Fig. 3 is a view along the lines of Fig. 2, of a part of modified form of scanning means, using an uninterrupted light spot.

In the drawing, I have sketchily shown induction heating apparatus for flowing tin-plated strip, the apparatus comprising a suitable heating coil means 2 comprising one or more inductor coils through which the strip 1 axially passes. The coil means 2 is energized by a tube-oscillator generator 4 which derives its direct-current operating energy primarily from a rectifier means 6 connected to the secondary of a step-up transformer 8. The primary of the transformer 8 is energized from an alternating-current power line 10, through any suitable voltage controlling means which in this embodiment being described is an induction regulator 12, although it may take any other form, depending on the control system.

The induction regulator 12 comprises a control element which can be reciprocably or oscillatably displaced for changing the voltage available at the primary of the transformer 8, and hence the power output of the tube-oscillator generator 4 to the coil means 2. For illustrating such conventional, or other, induction regulator, I have shown it schematically as comprising a shaft 14 which is angularly adjustable for varying the coupling of the related voltage changing windings of the induction regulator. The shaft 14 is moved, through gearing 16, by a reversible direct-current motor 18. For initially determining the direction of rotation and speed of the motor 18, its field 20 is connected through an adjustable resistor 22 to a direct-current line 24 of constant voltage. The motor armature 26 is controllably energized, in accordance with the described form of my invention, in a manner subsequently described. When the armature 26 moves, the induction regulator 12 is correspondingly adjusted for controlling the voltage at the transformer 8. When the armature 26 stops moving, the induction regulator 12 remains in its last position.

The coil means 2, when energized by the tube-oscillator generator 4, produces a pulsating field of energy in the space inside of it, the field being magnetic and heating the strip in the coil means. The strip 1 is passed downwardly through the energized coil means 2 by any suitable means, usually including a roller and driving and dragging units having various controls, such as is known to the art. Such strip driving equipment is schematically indicated at 27 and it drives the strip in the direction indicated by the arrow 28.

When sufficient power is put into the coil means 2, the spacial field of pulsating magnetic energy through which the strip passes can generate enough heating electrical currents in the strip to melt the tin coating while the strip is moving through a relatively short span constituting, in this case, substantially the length of the coil means. Starting at about room temperature at the entrance end of the coil means, the strip can be heated so that its tin coating will melt just short of the exit end of the coil means. A distinct line of demarcation can be observed between the matte finished surface of the unflowed tin and the shiny or mirror-like surface of the flowed tin. At this line of demarcation, or flow line, the material must have a temperature which is the melting point of tin.

As an illustration, but not as a limitation, a system for flowing tin plate, embodying my invention, comprised an induction heating coil means having three similar one-foot inductor coils, in tandem, with one foot between the ends of the coils, making a total length of five feet for the principal heating zone. In this system, as much as 1200 kilowatts could be supplied to the inductor coils, at frequencies of from about 50 to about 500 kilocycles, for heating tin plate of various thicknesses up to 40 mils and above, and up to 36 inches wide, and above, while traveling up to 1350 feet per minute. More than 200 pounds of the traveling strip could be heated per minute from about room to tin flowing temperatures.

For heating in air, which is simplest and most economical, the range of temperatures for tin flowing on traveling strip, which results in satisfactory tin plate, is not as yet definitely known. It may depend on such variable factors as the length of time that the surface is above the tin-melting temperature, the speed with which the strip is heated, and the extent to which the hot surface is exposed to oxidation or tarnishing. In any event, it is desirable to keep a definite spot of the tin plate within a proper temperature range, in order to minimize waste and spoilage sufficiently to render the system practicable. Experience with apparatus such as described hereinbefore, including the aforesaid application, indicates that the temperature, as closely as can be measured, for flowing the tin coating of tin plate, in air, should be between about 460° F. and 520° F. A mean temperature that approximates 490° F. with a mean deviation of ±15° F. and a maximum deviation of less than 30° F., seems very satisfactory. Assuming that the temperature of the incoming tin plate is near room temperature, say 120° F., the average temperature gradient of the material in a five-foot span of the coil means 2 may be as much as 80° F. per foot, and perhaps more.

When the strip is running at a constant speed, practically speaking, slight changes in the position of the line of demarcation might occur because of ordinary operating changes in the width or thickness or other physical properties of the strip, or in the high-frequency supply. However, such changes are gradual and can easily be compensated for by manual control of the heat-input to the strip. However, when the speed of the traveling strip is varied quickly, as when the leading end of a spool of strip is being secured to the trailing end of a strip from an unwound spool, for continuous production, manual control is unsatisfactory for practicable modern apparatus in which strip speeds change at rates as much as 100 feet per second per second, changing from a speed of 1350 feet per minute to 150 feet per minute in about 10 seconds, and vice versa. A control in accordance with my invention considers the time-lag of the apparatus and can maintain the line of demarcation within a desired spot during high and low speeds of the strip, and while the strip is decelerating or accelerating from such speeds.

A preferred form of my invention comprises a detecting means which includes a light responsive scanning device 30 that responds in accordance with the position and the velocity, or the rate of change of the position, of the line of demarcation; and a translating means 32 controlled by the scanning device for converting the response of the scanning device into a controlled operation on a variable control apparatus 34. The control apparatus 34 operates on the motor 18 which displaces the shaft 14 of the induction regulator for changing the voltage supplied to the alternating current generator 4, and hence its output, in a manner to counteract or compensate for variations from the proper heating conditions for the strip 1.

The scanning device 30 comprises a light source and lens system 36 at an edge of the strip, which produces a steady beam of light rays and casts it angularly and transversely on the strip 1 to form an elongated light spot 38 thereon. The scanning device 30 also includes a light sensitive means 40 which comprises a condensing lens and a photo-responsive cell 42. The angle of reflection of the light rays reflected from a bright mirror-like surface on the tin plate is such that the reflected light rays do not reach the photo-responsive cell 42. Diffused rays from a matte surface will, however, reach it.

For operation, it is preferable to adjust the parts of the scanning device 30 so that the line of demarcation 44, between the matte unflowed tin coating and the shiny mirror-like flowed tin coating of the tin plate, which is usually not a straight line, is, under satisfactory working conditions, at about the middle of the elongated light spot 38.

The light spot 38 may be continuous, between consecutive turns of a coil, as indicated at 38' in Fig. 3. In general, however, this will not always be possible or even desirable, especially with coils having close turns, if the light-spot is to span several turns of a coil. Since the coil is fixed, the diffusion and reflection of the light rays and the shadows caused by the coil are constant, so that the operation under a divided light spot is essentially the same as that with a continuous light spot.

The translating means 32 is electronic, being controlled by the light received by the scanning device 30. This translating means comprises a direct-current potentiometer 46 provided with a plurality of adjustable connectors, indicated by arrow heads, for permitting ready adjustment of the various control, biasing, and operating voltages taken from the potentiometer.

The photo-responsive cell 42 is in a grid-biasing circuit 48, 50, 52 of a control vacuum tube 54, this circuit including a resistor 56 adjustably connected to a bias potentiometer 58. The plate circuit of the tube comprises a branch 60, 62 which includes a resistor 64.

One side of a capacitor 66 is connected to a point at the same potential as 60, this capacitor being part of a grid biasing circuit 60, 68, 70 for a control vacuum tube 72, this circuit including a resistor 74 which is in series with the capacitor 66, and from which the grid bias is obtained. This bias can be initially adjusted through the connections shown. The plate circuit of the tube 72 comprises a branch 76, 78 which includes a resistor 79.

The outputs of the tubes 54 and 72 are used to control similar gaseous tubes 80 and 82, each of which is of the type which becomes conducting when the phase, or magnitude, or both, of its grid potential has a proper relation to its plate potential, and then stays conducting until its plate potential becomes substantially zero. A thyratron is a form of such tubes. The grids of the tubes 80 and 82 are respectively connected, through the resistors 84, to the points 60 and 76 in the plate circuits of the tubes 54 and 72. These grids are adjustably biased negatively by means including a battery 86 or the equivalent, and balancing resistors 88 and 90. The plate circuits of the tubes 80 and 82 include the operating coils of relays 92 and 94, respectively, and are supplied with commercial alternating current from a power line 96. With the relays 92 and 94 de-energized, which is the normal condition when the strip is being heated properly, their respective contacts 98 are in open position and their contacts 102 in closed position.

As stated hereinbefore, the power output of the oscillator 4 depends on the position of the variable induction regulator 12 which is mechanically controlled by the direct-current reversible motor 18. The armature of the motor may be included in an operating circuit having a direct current source 104 of constant voltage, or a source 106 adapted to supply a direct-current voltage having a magnitude which is proportional to the speed of travel of the strip 1. The latter may comprise a speed responsive magneto or generator mechanically geared to the driving equipment 27.

For normal operating speeds, the induction regulator 12 may be adjusted manually. To this end a normally open power-raising push button 108 and a normally open power-lowering push button 110 are provided respectively controlling raising relay 112 and lowering relay 114. These push buttons may, if desired, be tied in with the operation of the driving equipment 27.

When the push button 108 is closed, relay 112 is energized and moves its contacts 116 and 118 to closed position and its contact 120 to open position. A circuit is completed as follows from the positive conductor 122 of the source 104, contact 118 in closed position, conductor 124, motor armature 26, adjusting resistor 126, conductor 128, both of the normally closed contacts 102 and protective resistors 130 and 132 in series, conductor 134, contact 116 in closed position, through adjusting resistor 136, to the negative conductor of the source 104. So long as the power-raising push button 108 remains closed, motor 18 will move the shaft 14 in a direction which is assumed to be such as to increase the secondary voltage of the transformer 8, thereby increasing the direct current power supply to the oscillator 4 and the high-frequency power to the induction heating means 2. The current flow through the armature 26 for raising the power input to the strip is assumed to be in the direction of the arrow 138. When the current flow is in the reverse or opposite direction, the induction regulator is changed to lower the voltage to the tube-oscillator and hence lower the power input to the strip.

Releasing the push button 108 de-energizes relay 112 and its contacts 116 and 118 move to open position, de-energizing the circuit just described. The contact 120 of the relay 112 is moved to closed position, connecting a shorting circuit including a shorting conductor 139 across the armature 26, instead of the source 104, so that the armature 26 remains stationary until current is again forced through it. The induction regulator 12 will remain in the position to which it has been adjusted.

When the power-decreasing push button 110 is closed, relay 114 is energized and moves its contacts 140 and 142 to closed position to complete an armature circuit, similar to that previously traced, but so connected as to cause the current flow in the armature 26 to be in the direction opposite to that indicated by the arrow 138. Accordingly, the inductor regulator 12 will operate, so long as contacts 140 and 142 are in closed position, to cause the heat input to the strip 1 to be lowered. When relay 114 is de-energized, contacts 140 and 142 are moved to open position, and contact 146 is moved from open to closed position, substituting a battery-free shorting circuit comprising the conductor 139, across the armature 26. The movement of the armature 26 is, accordingly, stopped, and the induction regulator remains in the last position to which it has been moved.

Automatic control obtains through relays 92 and 94, the relay 92 being the power-lowering relay. When relay 92 is energized its contacts 98 and 102 move, respectively, to closed and open positions. The now-open contact 102 of the relay 92 interrupts the shorting circuit across the armature 26; and an energizing circuit is completed starting from the positive side of the speed responsive generator 106, and continuing through conductor 148, the double pole, double throw switch 150 in its left position with respect to Fig. 1, resistor 130, normally closed contact 102 of the power-raising relay 94, resistor 126, armature 26, conductor 124, contacts 120 and 146 in closed position, conductor 134, now-closed contact 98 of the power-lowering relay 92, and back to the negative side of the generator 106 via conductor 152.

Should the power-raising relay 94 be energized and the power-lowering relay 92 de-energized, a somewhat similar circuit can be traced from the speed responsive generator 106 with the current flow, however, in the opposite direction through the armature 26 as compared to the direction of current flow with relay 92 energized. The current flow with relay 94 energized is in direction of the arrow 138, so that the power input to the strip is increased.

With special reference to Fig. 2, the spaced lines $a$ and $b$ indicate the range in the light spot 38 in which it is preferable to maintain the line of demarcation or flow-line 44, so that the temperature variation of ±15° is closely approximated. In the normal range, the inductor regulator can be assumed properly set in connection with the tube-oscillator equipment so that the right power is being delivered to the strip 1. Under this condition, the adjustments are such that the grid biases on the tubes 80 and 82 are not sufficient to trigger them or render them conducting. The potentials of the grids of the tubes 80 and 82 are substantially the same as the potentials of points 60 and 76 respectively. Tubes 54 and 72 will conduct normal currents when the flow line is substantially at the center of the illuminated region within the lines $a$ and $b$.

Should the flow-line 44 move in the direction from line $c$ to line $d$ of the light spot, indicating a heat-supply greater than the heat required by the strip for the heat-treatment, less light will reach the photo-responsive cell 42 and in effect its impedance increases, thereby causing the grid of the tube 54 to become relatively more negative. This increases the impedance of the tube 54, raising the potential of point 60 in a positive direction. Inasmuch as the capacitor 66 acts as a short-circuit at the first instant of current-change, the potential of conductor 68 temporarily increases, causing the impedance of tube 72 to decrease, so that the potential of point 76 becomes relatively more negative.

The potentials of points 60 and 76 also move in reverse directions should the flow-line 44 move in the direction from $d$ to $c$, indicating an insufficient heat-supply for flowing the tin coating. In this case, the light reaching the photo-responsive cell 42 increases, causing the point 60 to become more negative while that of point 76 becomes more positive.

The potential of the point 60 is determined by the position of the flow-line 44; and the potential of the point 76 will be determined by the existing rate of change of the flow-line from such position. Both the position and the velocity of the flow-line will determine which of the tubes 80 and 82 will fire and the overall time it will conduct so as to keep its associated relay energized. The relays 92 and 94 are somewhat too slow to release in a half-cycle period of the alternating current source on the line 96.

In the circuit shown, with resistors 88 and 90 equal and resistors 64 and 79 equal, the power-lowering tube 80 and corresponding relay 92 will be actuated when the potential of point 60 is positive relative to point 76 by an amount equal to twice the fixed bias applied to the tubes through the battery 86. Similarly, the power-raising tube 82 and relay 94 will be actuated when point 76 is positive, by the same amount, relative to point 60.

When the flow-line 44 remains within the limits of the illuminated region bounded by lines $a$ and $b$ and changes its position only slowly, the potential difference between points 60 and 76 is insufficient to cause actuation of either relay 92 or 94. This establishes a dead zone or narrow range of flow-line positions where the power is not necessarily changed. The width of this dead zone depends on the adjustments used.

Irrespective of the position of the flow-line in the illuminated area, if it is changing its position at a sufficiently rapid rate, determined by the capacitor 66, resistor 74 and its bias, either the power-raising relay 94 or power-lowering relay 92 will be actuated, depending on whether the direction of the change calls for more or less power, that is, depending on whether the flow-line is moving in the direction $d$ to $c$ or in the direction $c$ to $d$.

Now if the flow-line 44 lies between lines $b$ and $c$ or lines $a$ and $d$, the power-raising or power-lowering relay will be actuated, whichever the case calls for, to return the reflow line toward the zone within the lines $a$ and $b$, unless the velocity of the flow-line in the direction toward this zone is already high enough to carry the flow-line into the zone. Under the latter conditions neither relay 92 or 94 will be actuated. If the velocity should be very high, the potential of point 76 may be so changed as to actuate the relay 92 or 94 so as to oppose the shift of the flow-line, thereby decreasing its velocity, and preventing its overshooting the zone within the lines $a$ and $b$.

In view of the foregoing, it is apparent that the position of the flow-line, lying between the light-spot portions at the far extremities or lines $c$ and $d$, is alone sufficient to cause an actuation of a relay 92 or 94, since the potential of the point 60 will depend thereon. By also affecting the potential of the point 76, the system is made to respond also to the rate at which the positions of the flow-line changes.

The rate of movement of the induction regulator, when a relay 92 or 94 is actuated, depends, in a manner, on the speed of travel of the strip 1 because of the speed-responsive generator 106. When the strip speed is low, this voltage, which is applied to the armature 26 of the motor 18, is correspondingly low, so that the accompanying change in power is slow. With high strip speeds a more rapid change in power is necessary, and this, of course, obtains because the voltage of the generator 106 is higher.

With suitable apparatus, however, it is not necessary to use a direct-current source such as the speed-responsive generator 106. An alternative can be obtained by throwing switch 150 to the right, thereby substituting a constant voltage source 154 for that derived from the speed-responsive generator 106. As still an additional alternative, a constant direct-current voltage can be added to that of the generator 106. To this end, normally closed switch 156 can be moved to terminal 158, so that the battery 160 is in the circuit including the generator 106.

When the strip is being accelerated or decelerated, the automatic control is superimposed on the manual control. When one or the other of the push buttons 108 and 110 is closed, the corresponding relay 112 or 114 is actuated, and a corresponding contact 120 or 146 is opened. As a consequence the voltage source 104 is placed in series with the voltage source 106 or 154, depending on the position of the switch 150.

The provision of a dead zone, or range of temperatures which causes the flow-line to lie within the lines $a$ and $b$ of the light spot 38, is desirable for eliminating oscillation or overshooting of the flow-line. The minimum span of this temperature range should be about 25 to 30° F. for the system described, while that between lines $c$ and $d$ should represent about the maximum permissible temperature deviation of about 60° F.

In general, in a system such as described, the tendency of the flow-line to hunt arises out of a time lag, D1, between the movement of the flow-line calling for a change in power to counteract it, and the initiation of such power change, and also on a time lag of the consequent movement of the flow-line for responding to the actual change in power.

In a tin flowing system such as described, an important time lag is the period from the instant the scanning-device calls for a power change to the instant that the induction regulator is fully accelerated, and may be a factor in choosing the width of the dead zone. On the assumption that the induction regulator can be displaced at substantially a constant speed in either direction, and that the power wave is symmetrical and linear, and that the heating is only within the actual induction coil turns and is linearly distributed, oscillation or hunting of the flow-line can be avoided by making the time in which the induction regulator can be angularly adjusted from 0 to 90° not less than approximately $$90\frac{(T_m-T_o)}{\Delta T}(D1)\frac{1}{P}\cdot\frac{dP}{d\theta} \text{ or } 90\frac{X}{\Delta X}D1\cdot\frac{1}{P}\cdot\frac{dP}{d\theta}$$

and where $T_m-T_o$=temperature rise of strip to the melting point of the tin coating.
$\Delta T$=temperature range of dead zone.
$X$=length of heating zone from the entrance end of the coil means to the center of the scanning zone.
$\Delta X$=the length of the dead zone, or the distance between lines $a$ and $b$.
$P$=average power input to the heating coil means. and $$\frac{dP}{d\theta}=$$

variation of power with displacement of induction regulator from 0° position, the position in which the voltage of the power line 10 is applied to the rectifier 6 without being affected by the induction regulator.

While I have described my invention with respect to the best mode of application preferred to me, it is obvious that its teachings are of more general purpose and application.

I claim as my invention:

Control apparatus of a type described comprising a pair of discharge tubes, each having a control electrode, voltage biasing means for said electrodes, comprising resistance means interconnecting said electrodes so that the bias on one moves in an opposite direction to that of the other, means for changing the voltage drop across said resistance means, comprising a potentiometer-means, a first vacuum tube having a cathode, an anode and a control electrode, the anode being connected to one side of said resistance means, a circuit means for biasing said anode and its control electrode from said potentiometer-means, a circuit comprising photo-responsive means, for biasing the last said control electrode, a second vacuum tube having a cathode, an anode and a control electrode, an interconnecting circuit means comprising a capacitor, connected to the anode of the first vacuum tube and to said second vacuum tube for controlling the bias of the control electrode of said second vacuum tube, and a connection between the anode of said second vacuum tube and the other side of said resistance means.

STEPHEN L. BURGWIN.

REFERENCES CITED

The following references are of record in the file of this patent:

UNITED STATES PATENTS

| Number | Name | Date |
| --- | --- | --- |
| 1,165,037 | Tarbox | Dec. 31, 1915 |
| 1,377,574 | Frary | May 10, 1921 |
| 1,800,303 | Lindsay | Apr. 14, 1931 |
| 1,900,842 | Northrup | Mar. 7, 1933 |
| 1,937,420 | Wood et al. | Nov. 28, 1933 |
| 1,971,313 | Johnson | Aug. 21, 1934 |
| 2,019,555 | Wood et al. | Nov. 5, 1935 |
| 2,040,343 | Simons et al. | May 12, 1936 |
| 2,041,029 | Stargardter | May 19, 1936 |
| 2,085,543 | Oplinger | June 29, 1937 |
| 2,109,776 | Johnson | Mar. 1, 1938 |
| 2,205,424 | Leonard | June 25, 1940 |
| 2,237,309 | McMinn | Apr. 8, 1941 |
| 2,251,277 | Hart et al. | Aug. 5, 1941 |
| 2,293,047 | Denneen et al. | Aug. 18, 1942 |

OTHER REFERENCES

Erbe, "Electrolytic Tin-Plating Lines and Reflow Methods," "Westinghouse Engineer," November 1942, pages 117–122, particularly page 121.

Stoltz et al., "Electric Apparatus Used in Electro-tinning," Transactions of the Electrochemical Society, vol. 84, pages 273–275, October 15, 1943.